United States Patent
Ohira et al.

(10) Patent No.: US 9,342,753 B2
(45) Date of Patent: May 17, 2016

(54) IMAGE PROCESSING APPARATUS, IMAGE PROCESSING METHOD, AND COMPUTER PROGRAM PRODUCT

(71) Applicant: KABUSHIKI KAISHA TOSHIBA, Tokyo (JP)

(72) Inventors: Hidetaka Ohira, Kawasaki (JP); Masahiro Sekine, Fuchu (JP); Masashi Nishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 148 days.

(21) Appl. No.: 14/198,835

(22) Filed: Mar. 6, 2014

(65) Prior Publication Data
US 2014/0286530 A1 Sep. 25, 2014

(30) Foreign Application Priority Data
Mar. 22, 2013 (JP) ................................. 2013-060718

(51) Int. Cl.
*G06K 9/46* (2006.01)

(52) U.S. Cl.
CPC ...... *G06K 9/4671* (2013.01); *G06K 2009/4666* (2013.01)

(58) Field of Classification Search
CPC .............. G06K 2009/4666; G06K 9/4671; G06K 9/4676; G06T 7/004; G06T 7/0042
See application file for complete search history.

(56) References Cited

U.S. PATENT DOCUMENTS

| | | | | |
|---|---|---|---|---|
| 4,769,850 A * | 9/1988 | Itoh et al. | ............. | G06K 9/4609 382/25 |
| 9,014,484 B2 * | 4/2015 | Ohira et al. | ........ | G06K 9/00523 382/206 |
| 2010/0287511 A1 | 11/2010 | Meier et al. | ................... | 715/848 |
| 2011/0255781 A1 * | 10/2011 | Hamsici et al. | ....... | G06K 9/4671 382/170 |
| 2013/0195367 A1 | 8/2013 | Ohira et al. | ........ | G06K 9/00523 |
| 2014/0064556 A1 | 3/2014 | Ohira et al. | .......... | G06K 9/3241 |

FOREIGN PATENT DOCUMENTS

| JP | 2010-541053 A | 12/2010 | ............. G06T 17/40 |
|---|---|---|---|
| WO | WO 2009/040093 A1 * | 4/2009 | ............. G06T 15/20 |

OTHER PUBLICATIONS

Ohira et al., U.S. Appl. No. 13/676,640, filed Nov. 14, 2012.
Ohira et al., U.S. Appl. No. 13/915,979, filed Jun. 12, 2013.

* cited by examiner

*Primary Examiner* — Andrew W Johns
(74) *Attorney, Agent, or Firm* — Nixon & Vanderhye, P.C.

(57) ABSTRACT

According to an embodiment, an image processing apparatus includes an acquisition unit, a setting unit, and a calculator. The acquisition unit is configured to acquire an image. The setting unit is configured to set a plurality of sampling points in a sampling area of the image, each sampling point being associated with a calculation area. The calculator is configured to calculate feature values of the image in the calculation area. The setting unit is configured to set the sampling points to provide at least one of an arrangement in which distances between the adjacent sampling points change with distances from a center of the sampling area, and an arrangement in which the sampling points exist on circumferences of a plurality of circles different in diameter.

15 Claims, 18 Drawing Sheets

WEIGHTED SUM $F_x$ IN x DIRECTION

WEIGHTED SUM $F_y$ IN y DIRECTION

FIG.18
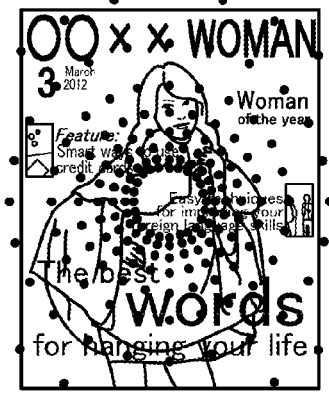
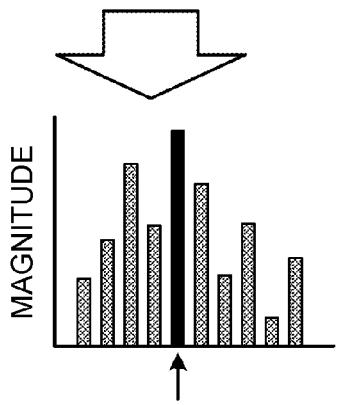
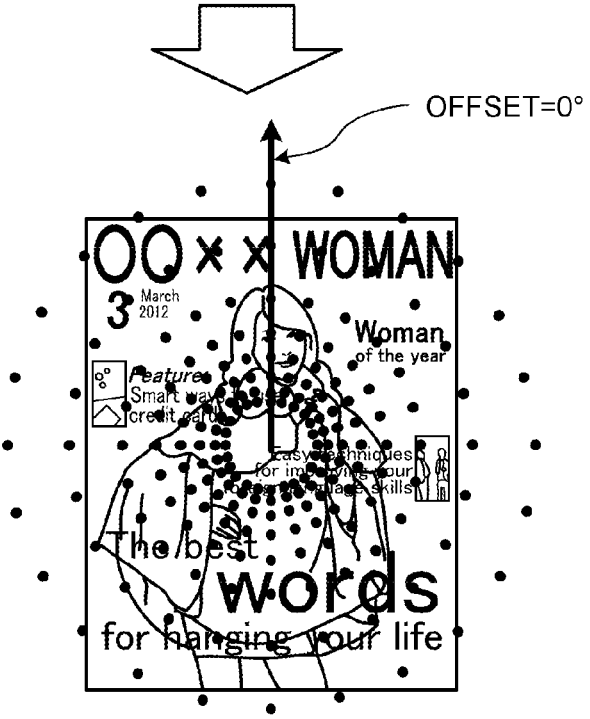

IMAGE PROCESSING APPARATUS, IMAGE PROCESSING METHOD, AND COMPUTER PROGRAM PRODUCT

CROSS-REFERENCE TO RELATED APPLICATION

This application is based upon and claims the benefit of priority from Japanese Patent Application No. 2013-060718, filed on Mar. 22, 2013; the entire contents of which are incorporated herein by reference.

FIELD

Embodiments described herein relate to an image processing apparatus, an image processing method, and a computer program product.

BACKGROUND

As a method for realizing augmented reality with an image recognition technology, it has been known to use markers. However, the use of mechanical markers results in the impairment of design. In order to solve this problem, there has been known a method for specifying an object based on local feature values resistant to a change in the status of the object (such as the rotation of the object and a change in the distance of the object) without using markers.

However, according to object recognition based on local feature values in the related art, it is necessary to calculate feature values for each of in-plane rotating estimation, multi-scale searching, and feature value extraction for object recognition. Therefore, a processing load increases, which in turn hinders a comfortable operation when a lot of objects are recognized.

BRIEF DESCRIPTION OF THE DRAWINGS

FIG. 18 is a diagram for explaining an example of image processing in a case in which an image capturing angle is different.

DETAILED DESCRIPTION

According to an embodiment, an image processing apparatus includes an acquisition unit, a setting unit, and a calculator. The acquisition unit is configured to acquire an image. The setting unit is configured to set a plurality of sampling points in a sampling area of the image, each sampling point being associated with a calculation area. The calculator is configured to calculate feature values of the image in the calculation area. The setting unit is configured to set the sampling points to provide at least one of an arrangement in which distances between the adjacent sampling points change with distances from a center of the sampling area, and an arrangement in which the sampling points exist on circumferences of a plurality of circles different in diameter.

Hereinafter, with reference to the accompanying drawings, a description will be given in detail of the preferred embodiments of an image processing apparatus according to the present invention.

In-plane rotating estimation refers to processing in which the rotation of an object with respect to a reference direction (rotating angle or the like) in the plane of an image is estimated. In the related art, for example, feature values for in-plane rotating estimation are calculated, and then feature values for object detection are further calculated from an image rotated according to an estimation result. Multi-scale searching refers to processing in which the degree of the magnification or reduction of an image as an object for object detection is searched in comparison with an image obtained when a registration object registered beforehand for detection is captured. In the related art, for example, feature values are calculated for multi-scale searching, scales (such as magnification and reduction ratios) are calculated using the feature values, and feature values for object detection are further calculated from the areas of an image whose arrangement has been changed according to the scales or the like.

In the image processing apparatus according to the embodiment, sampling points are arranged such that each of in-plane rotating estimation, multi-scale searching, and feature value extraction requires feature value calculation processing once. Thus, a processing load (processing cost) to calculate feature values can be reduced.

In the following exemplification, the image processing apparatus is implemented as an object detection apparatus that detects an object from an image with image recognition.

An applicable apparatus is not limited to an object detection apparatus. For example, the image processing apparatus may be implemented as an apparatus that does not have a function to detect an object and thus performs the extraction of feature values used for object detection or the like.

Figure 1:
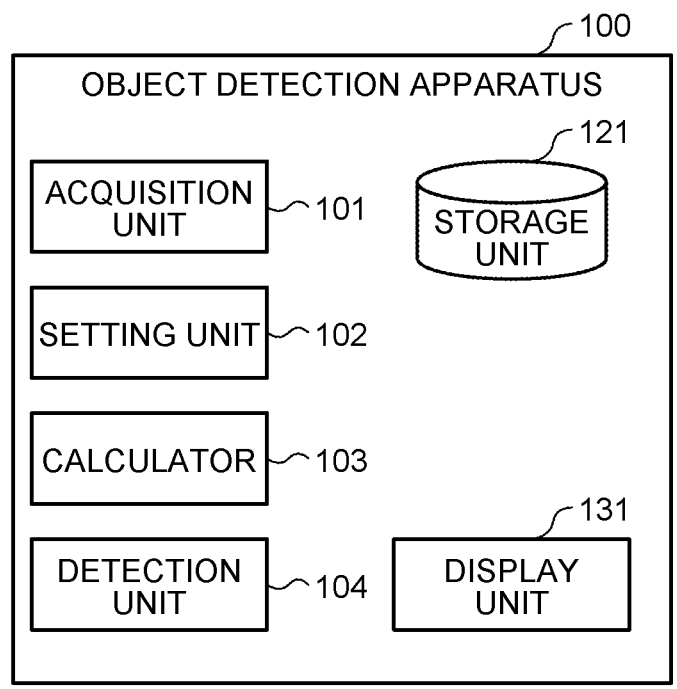
FIG. 1 is a block diagram of an object detection apparatus according to an embodiment.

FIG. 1 is a block diagram illustrating a function configuration example of an object detection apparatus 100 according to the embodiment. The object detection apparatus 100 has a storage unit 121, a display unit 131, an acquisition unit 101, a setting unit 102, a calculator 103, and a detection unit 104.

The storage unit 121 stores information to be referred when various processing steps are performed. For example, the storage unit 121 stores information used to specify a registered object set beforehand and feature values calculated from an image of the registered object so as to be associated with each other. The detection unit 104 that will be described later identifies feature values stored in the storage unit 121 with the feature values of an object calculated from a captured image to detect a registered object matching the object. Note that the storage unit 121 can be composed of any general storage medium such as a HDD (Hard Disk Drive), an optical disk, a memory card, and a RAM (Random Access Memory).

The display unit 131 is used to display various information items and can be implemented by a display device such as a liquid crystal display and a touch panel display.

The acquisition unit 101 acquires an image in which an object is captured. The acquisition unit 101 can be configured to acquire an image captured by a camera, for example, if the object detection apparatus 100 has the image capturing unit (camera) mounted thereon. The acquisition unit 101 may be configured to acquire an image from an apparatus outside the object detection apparatus 100.

The setting unit 102 sets the sizes of calculation areas used to calculate feature values, the positions of calculation areas, and the positions of sampling points serving as bases for calculation areas. Sampling points are points serving as bases for areas used to extract feature values. Calculation areas are the areas of an image from which feature values are calculated. In addition, each of calculation areas is not necessarily one consecutive area but may include, for example, a plurality areas arranged around sampling points.

The setting unit 102 sets a plurality of sampling points used to calculate feature values in, for example, the area (sampling area) of an image. In addition, the setting unit 102 sets calculation areas to be associated with respective sampling points. The setting unit 102 arranges sampling points to provide at least one of an arrangement (A1) in which the distances between adjacent sampling points become smaller toward the center of a sampling area and an arrangement (A2) in which sampling points exist on the circumferences of a plurality of circles different in diameter.

As will be described later, the arrangement (A1) enables the standardization of feature value calculation processing required for multi-scale searching and feature value extraction for object recognition. In addition, the arrangement (A2) enables the standardization of feature value calculation processing required for in-plane rotating estimation and feature value extraction for object recognition. In the following exemplification, both of the arrangements (A1) and (A2) are applied. However, one of the arrangements may be applied. Thus, it is possible to standardize feature value calculation processing required for at least two processing steps and reduce a processing load.

The calculator 103 calculates the feature values of an image from calculation areas associated with sampling points. Feature values calculated by the calculator 103 may not be particularly limited so long as they are capable of being calculated from the areas (calculation areas) of an image. In addition, the calculator 103 calculates the rotating angle (in-plane rotating angle) of an object in the plane of an image using calculated feature values (in-plane rotating estimation). Note that feature values for in-plane rotating estimation are also used for the detection of a registered object by the detection unit 104. In this way, feature value calculation processing is standardized. As a method for estimating a rotating angle, a known one may be applied depending on used feature values. A specific example of feature values will be described later.

The detection unit 104 compares calculated feature values with the feature values of a registered object stored in the storage unit 121 and specifies (detects) the registered object having feature values similar to or matching the calculated feature values as a registered object associated with an object. The feature values of a registered object are calculated beforehand in the same way as the calculator 103. The detection unit 104 may calculate the similarities between feature values with SSD (Sum of Squared Difference), SAD (Sum of Absolute Difference), normalized cross-correlation, or the like. In addition, the detection unit 104 may be configured to detect a registered object associated with an object with identification equipment such as a SVM (Support Vector Machine).

The detection unit 104 uses feature values calculated for some sampling points set according to each of multi-stage scales (such as magnification and reduction factors) out of sampling points in the sampling area. Thus, it is possible to detect a registered object having similar or matching feature values for each of the multi-stage scales. Further, it is possible to recognize a scale having a higher similarity or matching degree (multi-scale searching). The detection unit 104 can select feature values associated with some sampling points according to a scale out of feature values calculated by the calculator 103 and apply the same to detection processing. That is, there is no need to perform feature value calculation processing twice for multi-scale searching and object detection as in the related art.

The acquisition unit 101, the setting unit 102, the calculator 103, and the detection unit 104 may be implemented in such a way as to cause a processing unit such as a CPU (Central Processing Unit) to execute a program, i.e., they may be implemented by software. Alternatively, they may be implemented by hardware such as an IC (Integrated Circuit) or may be implemented by combining software and hardware.

Figure 2:
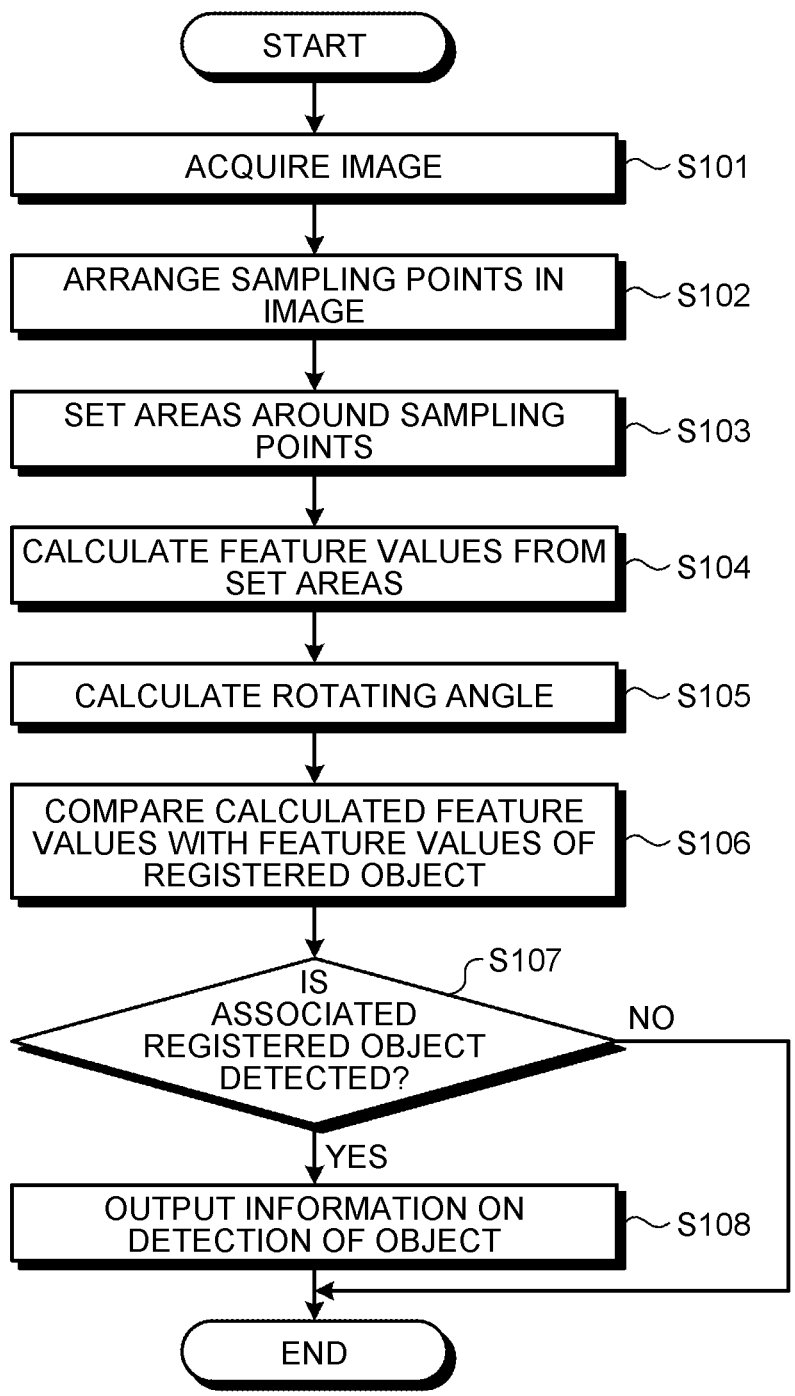
FIG. 2 is a flowchart of object detection processing according to the embodiment.

Next, with reference to FIG. 2, a description will be given of object detection processing by the object detection apparatus 100 thus configured according to the embodiment. FIG. 2 is a flowchart illustrating an example of the object detection processing according to the embodiment.

The acquisition unit 101 acquires an image captured by, for example, a camera (step S101). The setting unit 102 arranges sampling points in the acquired image (step S102). The setting unit 102 sets calculation areas around the sampling points (step S103). The calculator 103 calculates feature values from the set calculation areas (step S104). The calculator 103 calculates the rotating angle of an object in the plane of the image using the calculated feature values (step S105).

The detection unit 104 compares the calculated feature values with the feature values of a registered object stored in the storage unit 121 (step S106). The detection unit 104 compares the feature values corrected with reference to the rotating angle calculated in step S105 with the feature values of the registered object. That is, the detection unit 104 corrects the feature values into those having no rotation (or those having the same rotating angle as the registered object) and then compares the same with the feature values of the registered object. For example, if luminance gradient directions (edge directions) are used as feature values, feature values capable of being compared with the feature values of a registered object are obtained with the application of an offset equivalent to a rotating angle.

The detection unit 104 determines whether the associated registered object, i.e., the registered object having similar or matching feature values has been detected (step S107). If the associated object has been detected (Yes in step S107), the detection unit 104 outputs information on the detection of the object (step S108) to end the object detection processing. If the associated registered object has not been detected (No in step S107), the detection unit 104 ends the object detection processing.

The information on the detection of the object may be output to an external apparatus via a communication unit (not illustrated) or the like or may be output to (displayed on) the display unit 131. Alternatively, the detection unit 104 may display a content associated with a detection result on the display unit 131. For example, the detection unit 104 may streaming-distribute video associated with a detection result to the display unit 131 or may display a home page associated with a detection result on the display unit 131. Thus, it is possible to feed back a specific result to a user. If it takes time to distribute video or display a home page, it may also be possible to display animation indicating the recognition (detection) of an object on the display unit 131. Thus, it is possible to quickly feed back the recognition of an object to a user.

Figure 3:
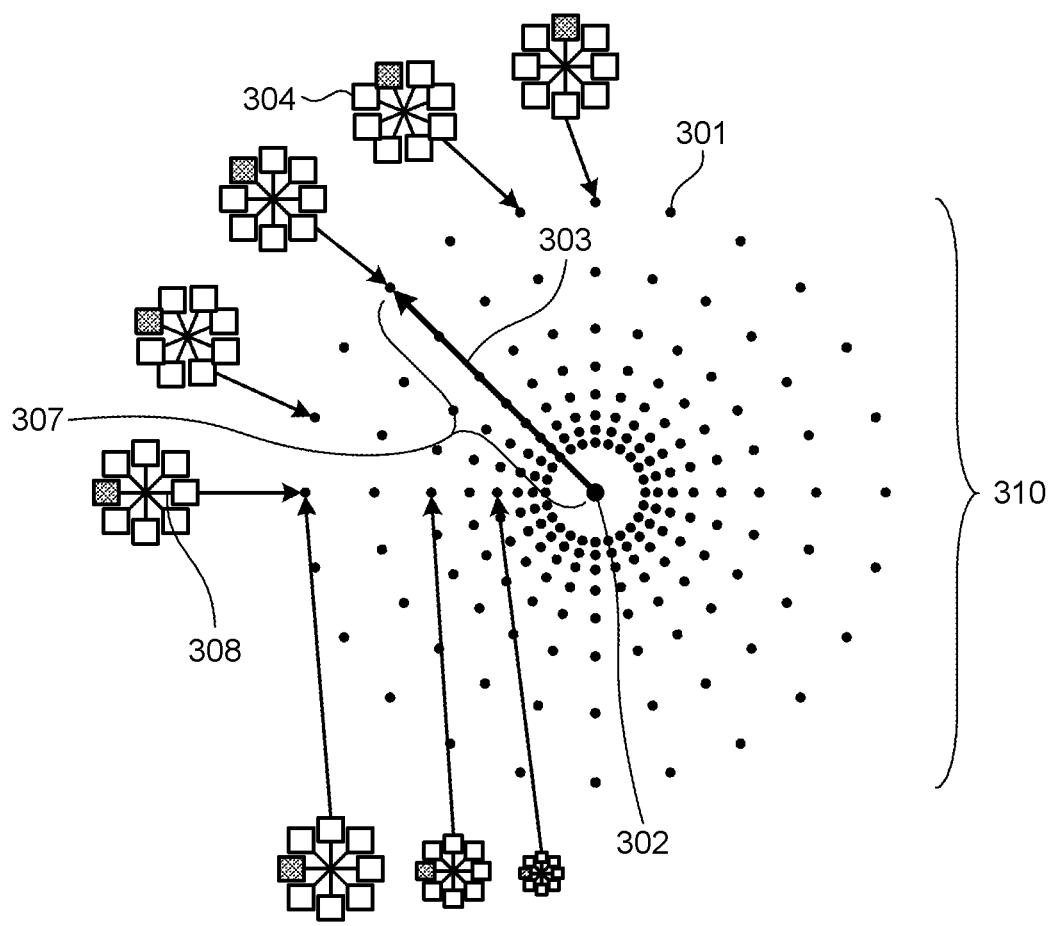
FIG. 3 is a diagram illustrating an arrangement example of sampling points and calculation areas.

Next, a description will be given of an arrangement example of sampling points. FIG. 3 is a diagram illustrating an arrangement example of sampling points and calculation areas. As illustrated in FIG. 3, one or more sampling points exist. In FIG. 3, black points represent the sampling points (such as a sampling point 301). The plurality of sampling points constitutes a sampling point group 310. For example, an area including the sampling point group 310 corresponds to a sampling area. A point 302 represents the center of the sampling area. An arrow 303 represents the direction of a sampling point with respect to the point 302. The length of the arrow is equivalent to a distance 307 between the center (point 302) of the sampling area and the sampling point. A line segment 308 represents the distance between a sampling point and a calculation area.

Each sampling point has one or more calculation areas 304. In the example of FIG. 3, each sampling point is associated with eight calculation areas. Feature values are calculated using the pixel values of the calculation areas.

The sampling points may be arranged such that they become denser toward the center of the sampling point group (sampling area) (the distances between the adjacent sampling points become smaller toward the center) (the arrangement A1 described above).

Figure 4:
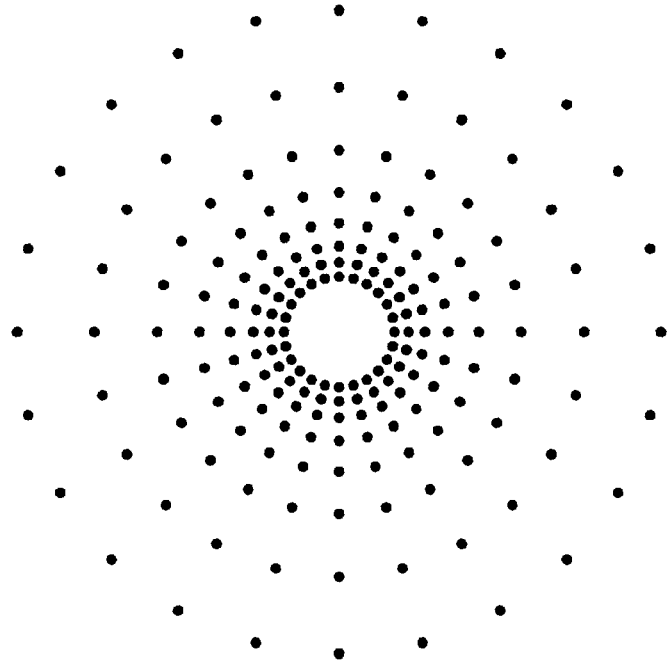
FIG. 4 is a diagram illustrating an arrangement example in which sampling points become denser toward a center.
Figure 5:
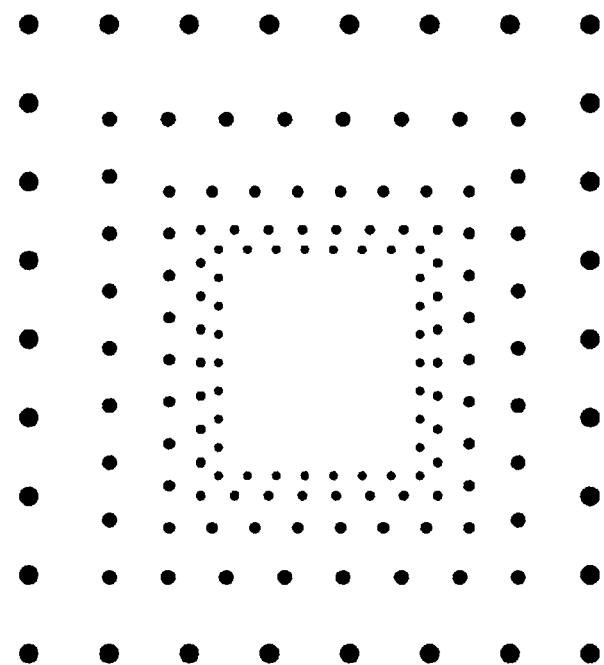
FIG. 5 is a diagram illustrating an arrangement example in which sampling points become denser toward a center.
Figure 6:
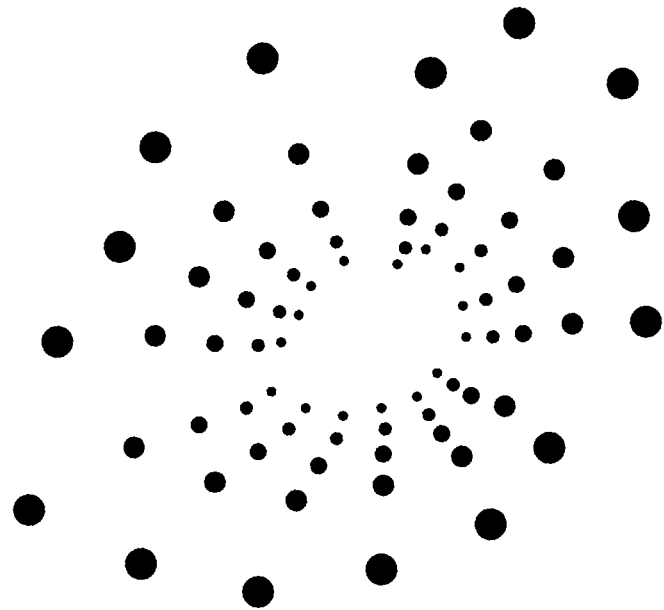
FIG. 6 is a diagram illustrating an arrangement example in which sampling points become denser toward a center.

FIGS. 4 to 6 are diagrams each illustrating an arrangement example in which sampling points become denser toward a center. FIG. 4 illustrates an example in which the same number of sampling points are evenly arranged on the circumferences of a plurality of circles different in diameter. FIG. 5 illustrates an example in which sampling points are arranged on a plurality of rectangles of which centers are coincident with each other. FIG. 6 illustrates an example in which sampling points are arranged on a plurality of free-form curves as indicated by dashed lines. Note that the dashed lines are drawn for the purposes of illustration.

Figure 7:
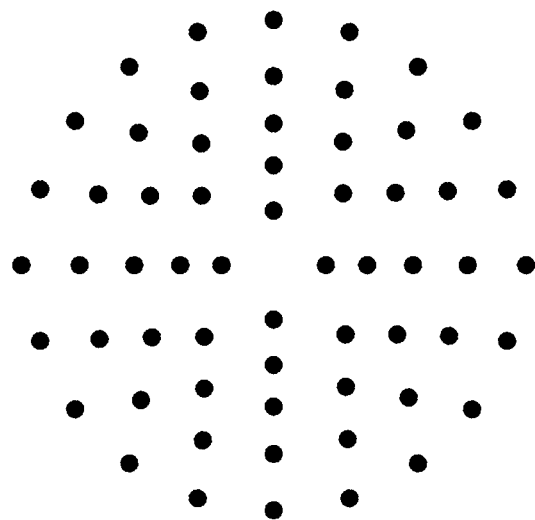
FIG. 7 is a diagram illustrating an example in which sampling points are arranged on a plurality of circumferences.

Sampling points may be arranged such that their densities become even or sparse irrespective of their positions. In this case, the sampling points exist on, for example, the circumferences of a plurality of circles different in diameter (the arrangement A2 described above). FIG. 7 is a diagram illustrating an example in which sampling points are arranged on a plurality of circumferences.

Figure 8:
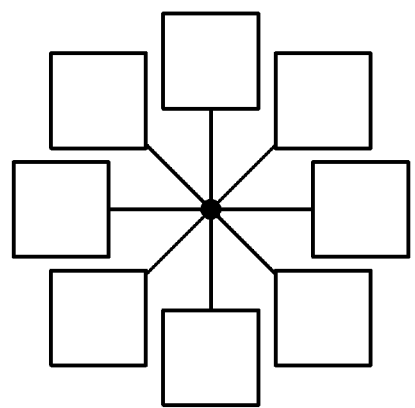
FIG. 8 is a diagram illustrating an arrangement example of calculation areas.
Figure 9:
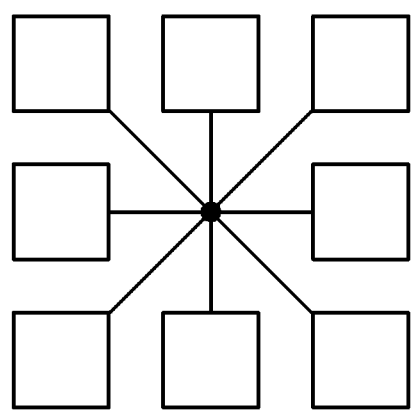
FIG. 9 is a diagram illustrating an arrangement example of calculation areas.
Figure 10:
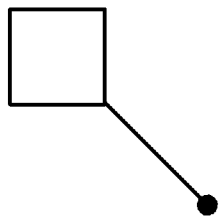
FIG. 10 is a diagram illustrating an arrangement example of a calculation area.
Figure 11:
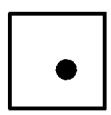
FIG. 11 is a diagram illustrating an arrangement example of a calculation area.

Next, a description will be given of an arrangement example of calculation areas. FIGS. 8 to 11 are diagrams each illustrating an arrangement example of calculation areas. FIG. 8 illustrates an example in which a plurality of calculation areas is arranged on a circumference apart from a sampling point at a certain distance. FIG. 9 illustrates an example in which a plurality of calculation areas is arranged on a rectangle apart from a sampling point at a certain distance. FIG. 10 illustrates an example in which one calculation area is arranged in a position apart from a sampling point at a certain distance. FIG. 11 illustrates an example in which one calculation area is arranged in the same position as a sampling point.

Figure 12:
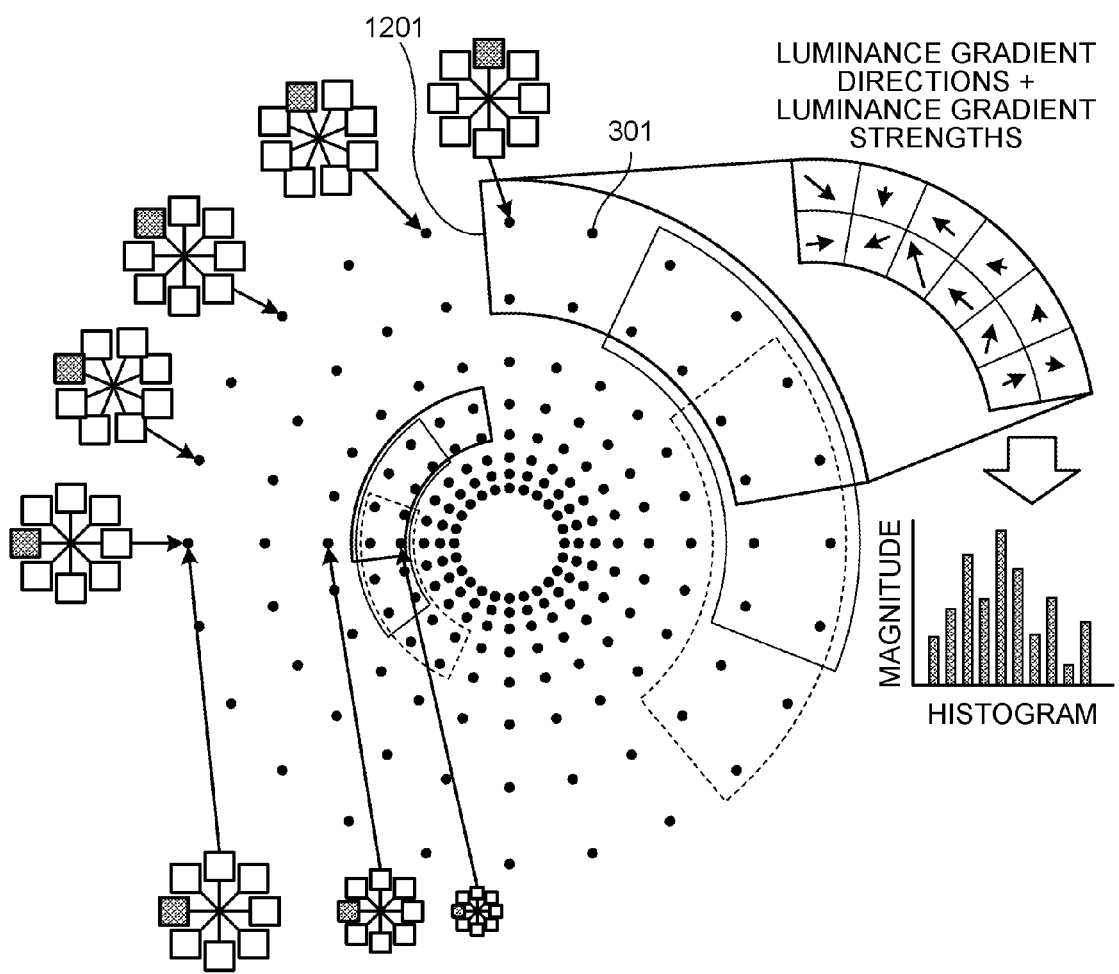
FIG. 12 is a diagram illustrating an arrangement example of sampling points and calculation areas.

FIG. 12 is a diagram illustrating another arrangement example of sampling points and calculation areas. As illustrated in FIG. 12, directions from sampling points to calculation areas may change with directions from the center of a sampling point group to the sampling points. FIG. 12 illustrates an example in which calculation areas are rotated such that the directions of sampling points with respect to the center are coincident with the directions of the calculation areas (calculation areas with oblique lines) with respect to the sampling points. Note that there is no need to rotate the calculation areas like this such that the directions are coincident with each other. In addition, the calculation areas may be rotated at random rotating angles.

Moreover, FIG. 12 illustrates an example in which sampling points closer to the center are associated with smaller calculation areas. Furthermore, FIG. 12 illustrates an example in which sampling points closer to the center are closer to associated calculation areas.

Such an arrangement is just an example, and the arrangement of calculation areas is not limited to it. For example, all the sizes of calculation areas may be the same. The sizes of calculation areas may be randomly set. Sampling points closer to the center may be associated with larger calculation areas. Sampling points closer to the center may be farther from associated calculation areas.

Calculation areas may be formed into any shape. For example, the shape of calculation areas may be a circle, an ellipse, a polygon, or a pixel. If the shape of calculation areas is a square or a rectangle, it is possible to quickly calculate the sum of the pixel values of the areas with Integral Image. If the shape of calculation areas is a polygon, it is possible to quickly calculate the sum of the pixel values of the areas with Slanted Integral Image.

Next, a description will be given of a specific example of feature values. The calculator 103 can calculate the following values as the feature values of respective sampling points.

Sum of the pixel values of pixels included in calculation areas

Figure 13:
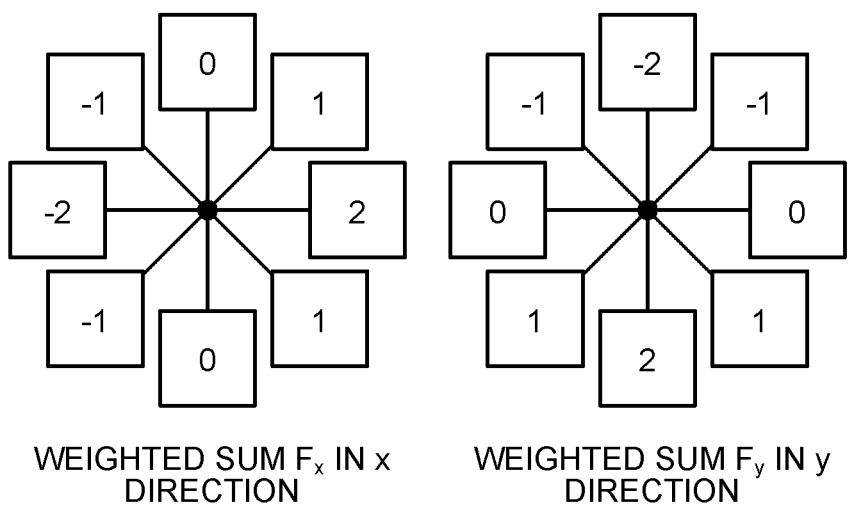
FIG. 13 is a diagram illustrating an example of feature values.

Value obtained by calculating the sum of pixel values for each plurality of calculation areas and weighting the sum of the pixel values of the respective calculation areas with a Gaussian filter or the like Value obtained by calculating the weighted sum of pixel values for each plurality of calculation areas and weighting the weighted sum of the respective calculation areas Value in a luminance gradient direction calculated with a Sobel filter or a Prewitt filter if the sizes of calculation areas are each made of one pixel Value in a luminance gradient direction calculated, after calculating the sum of pixel values for each plurality of calculation areas, based on the following formula (1) using weighted additional values (a weighted sum Fx in an x direction and a weighted sum Fy in a y direction) by which the sum of the pixel values of each calculation area is calculated from weights in the x and y directions illustrated in FIG. 13

Figure 14:
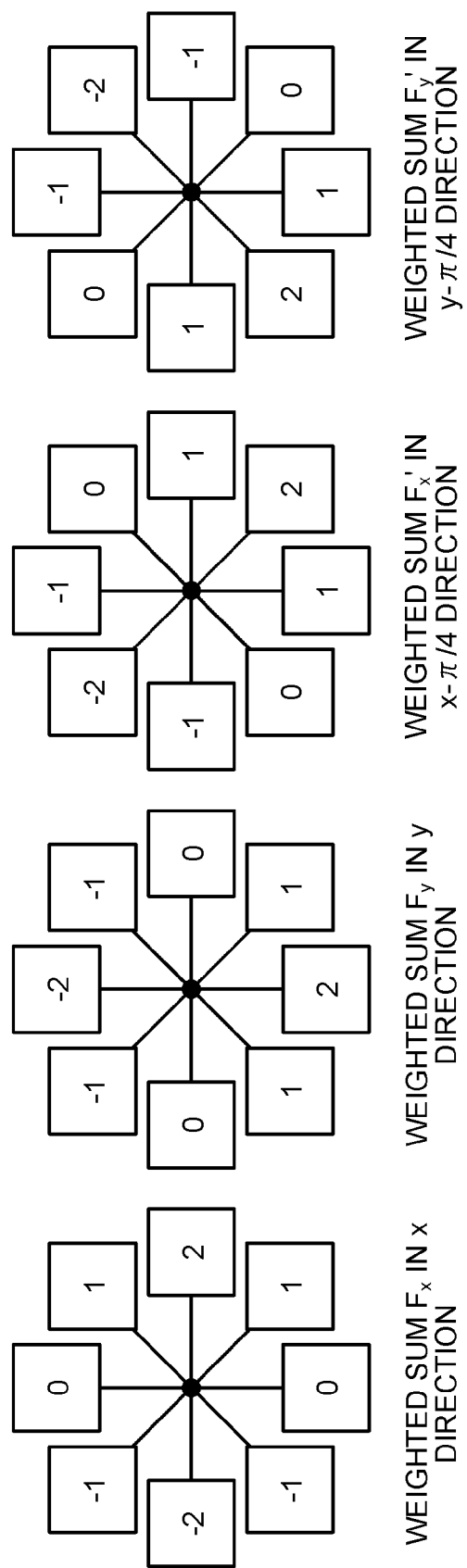
FIG. 14 is a diagram illustrating an example of feature values.

Value in a luminance gradient direction calculated, after calculating the sum of pixels values for each area, based on the following formula (2) using weighted additional values (weighted sums) Fx, Fy, F'x, and F'y by which the sum of the pixel values is calculated from four weights in an x direction, a y direction, an x–π/4 direction, and a y–π/4 direction illustrated in FIG. 14

$$f(x, y) = \tan^{-1}\left(\frac{F_y(x, y)}{F_x(x, y)}\right) \quad (1)$$

$$f(x, y) = \tan^{-1}\left(\frac{F''_y(x, y)}{F''_x(x, y)}\right)$$

$$F''_x(x, y) = F_x(x, y) + F'_x(x, y)\cos\left(\frac{\pi}{4}\right) + F'_y(x, y)\sin\left(\frac{\pi}{4}\right) \quad (2)$$

$$F''_y(x, y) = F_y(x, y) + F'_x(x, y)\sin\left(\frac{\pi}{4}\right) + F'_y(x, y)\cos\left(\frac{\pi}{4}\right)$$

The calculator 103 calculates feature values used for object detection from the feature values of respective sampling points. For example, as illustrated in FIG. 12, feature values used for object detection are calculated from a plurality of feature values obtained from a plurality of sampling points included in an area 1201. FIG. 12 illustrates an example of feature values in which the feature values (luminance gradient directions and luminance gradient strengths) of respective sampling points are expressed by a histogram. As illustrated in FIG. 12, the area 1201 used for calculating feature values is configured to change at, for example, even intervals.

The calculator 103 can calculate, for example, the following values as feature values used for object detection.

Sum of the feature value of each sampling point included in an area (the area 1201 in FIG. 12)

Feature value obtained by vectorizing the value of the feature value of each sampling point included in an area Feature value obtained by quantizing the value of the feature value of each sampling point included in an area and expressing the quantized value by a histogram Next, a description will be given of a specific example of image processing according to the embodiment.

Figure 15:
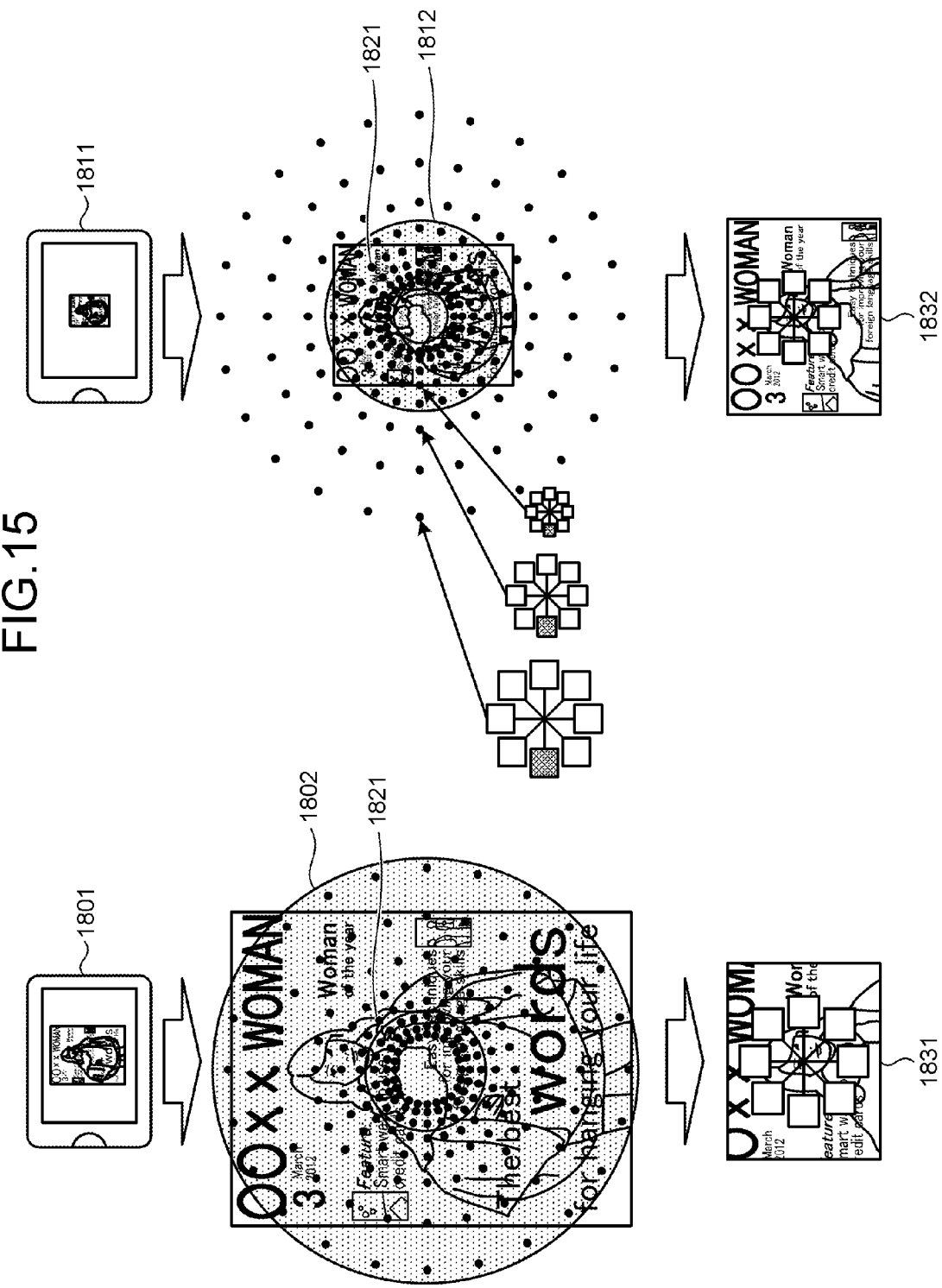
FIG. 15 is a diagram illustrating examples in which the distance between a camera and an object is different.

FIG. 15 is a diagram illustrating two examples different in the distance between a camera and an object. A screen 1801 on the left side illustrates an example of a screen that displays an image captured when the distance between the camera and the object is small. A screen 1811 on the right side is an example of a screen that displays the image captured when the distance between the camera and the object is large. In any case, the arrangement of sampling points may be the same. That is, sampling points are arranged such that they become denser toward the center of a sampling area (sampling point group). In addition, calculation areas are arranged such that the distances between sampling points and the calculation areas become smaller as the sampling points are closer to the center. Moreover, calculation areas are arranged such that they become smaller toward the center.

Thus, there is no need to set sampling points and calculation areas for each scale (for example, the distance between the camera and the object). In addition, only with the selection of sampling points corresponding to each scale out of common sampling points, it is possible to obtain feature values corresponding to the scale. Moreover, only with the change of the selection of sampling points, it is possible to extract the same feature values as those at registration even if the distance between the camera and the object is different from that at the registration.

In the example of the screen 1801 illustrated in FIG. 15, sampling points included in a doughnut-like area 1802 are selected. In the example of the screen 1811, sampling points included in a doughnut-like area 1812 are selected. The number of sampling points to be selected may be configured to be constant.

A sampling point 1821 is an example of a sampling point included in both of the areas 1802 and 1812. Like this, any sampling point commonly included in an area corresponding to each scale may exist. Therefore, for example, even in a configuration in which feature values are calculated after sampling points are selected for each scale, there is no need to calculate the feature values again for common sampling points after the scale is changed. Accordingly, it is possible to reduce a processing load.

An image 1831 illustrates an example of an image including calculation areas set with respect to sampling points in the area 1802. An image 1832 illustrates an example of an image including calculation areas set with respect to sampling points in the area 1812. In the embodiment, as described above, calculation areas are arranged such that they become smaller toward the center of a sampling area. Thus, only with the change of selected sampling points according to a scale, it is possible to obtain the same feature values as those at registration.

Even in a case in which one calculation area is arranged in the same position as a sampling point as illustrated in FIG. 11, the same rule as that illustrated in FIG. 15 can be applied. That is, sampling points are arranged such that they become denser toward the center of a sampling area, and calculation areas are arranged such that they become smaller toward the center of a sampling area.

Figure 16:
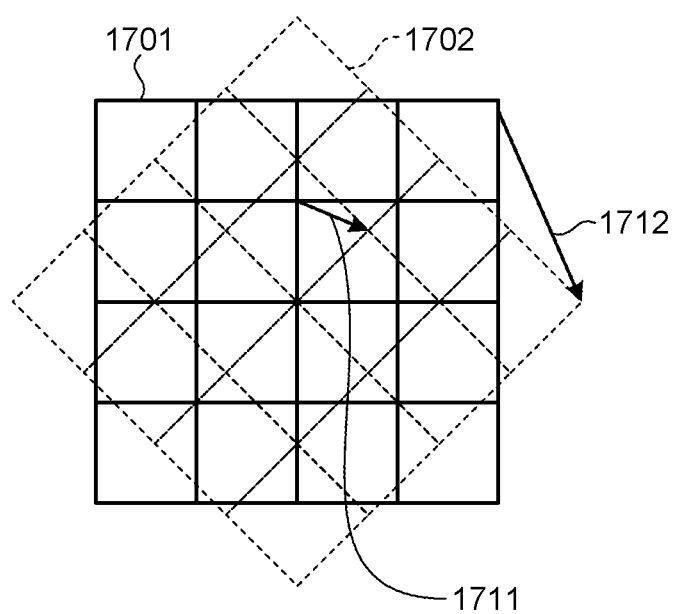
FIG. 16 is a diagram illustrating an example in which the image capturing angle of an object is different between registration and recognition.

FIG. 16 is a diagram illustrating an example in which the image capturing angle of an object is different between registration and recognition. FIG. 16 schematically illustrates an object using a rectangle with four X four squares. The vertical and horizontal directions of the figure represent the vertical and horizontal directions of an image obtained when the object is captured. An object 1701 represents an object at registration (registered object). An object 1702 represents an object at recognition. In the example of FIG. 16, the object 1702 at recognition is in a state of rotating clockwise with respect to the object 1701 at registration. Arrows 1711 and 1712 represent the inside and outside change amounts of the objects, respectively.

Figure 17:
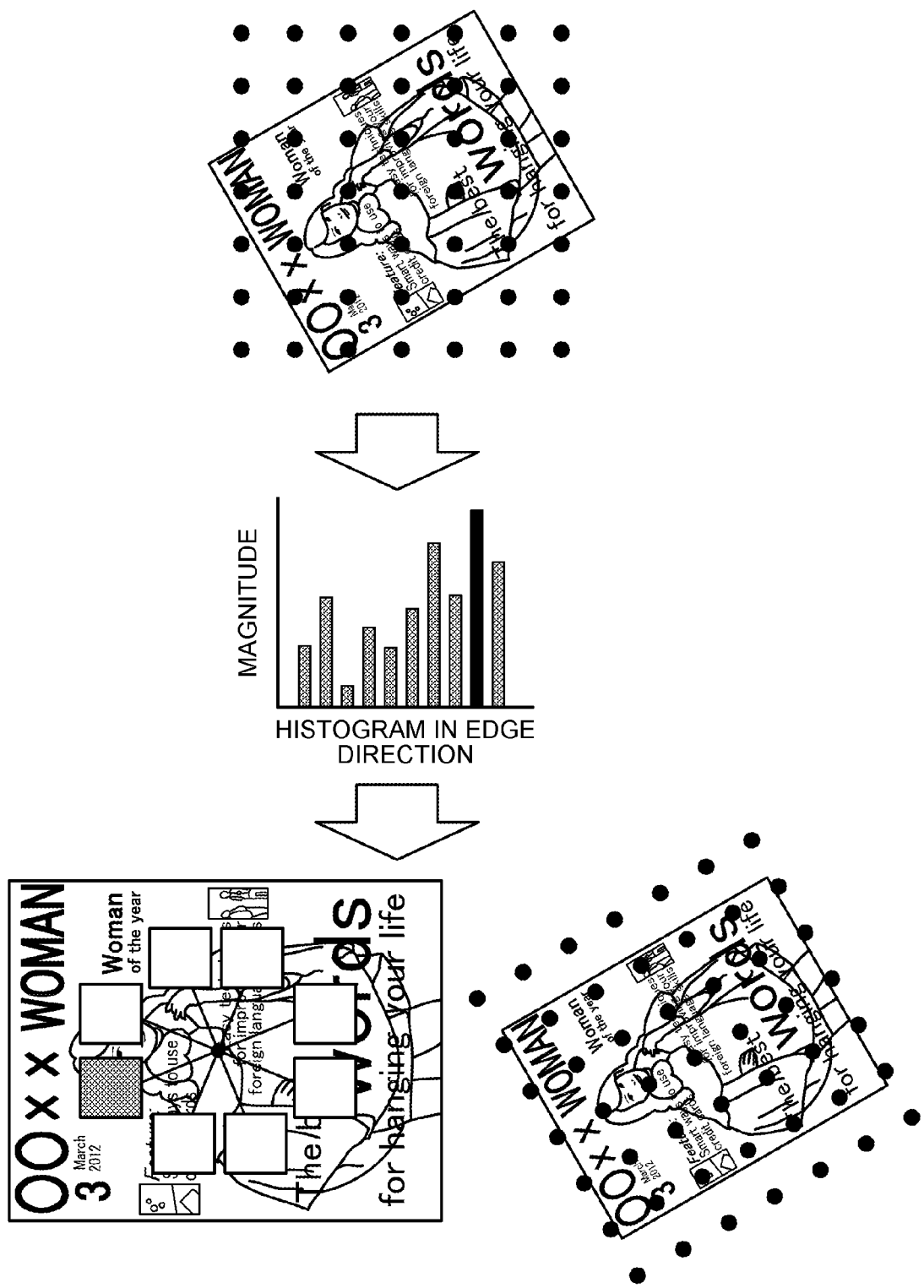
FIG. 17 is a diagram for explaining an example of image processing in a case in which an image capturing angle is different.
Figure 19:
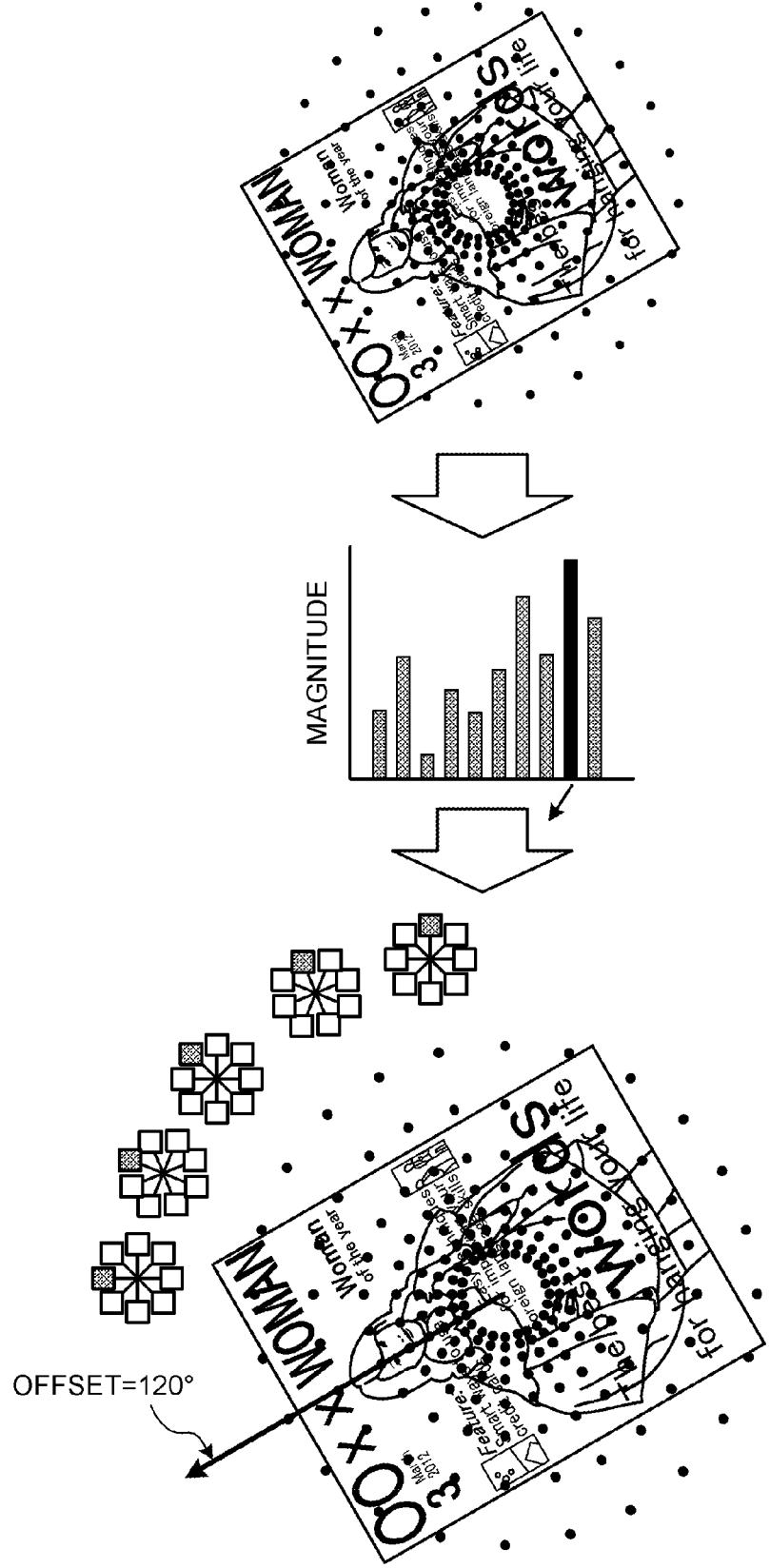
FIG. 19 is a diagram for explaining an example of image processing in a case in which an image capturing angle is different.

FIGS. 17 to 19 are diagrams for explaining an example of image processing in a case in which an image capturing angle is different. FIG. 17 is a diagram for explaining in-plane rotating estimation in the related art. In the related art, after feature values for in-plane rotating estimation are calculated, rotated sampling points are set corresponding to an estimated rotating angle to calculate the feature values again.

FIGS. 18 and 19 are diagrams for explaining in-plane rotating estimation according to the embodiment. FIG. 18 illustrates an example in which the rotating angle of an image with respect to the image at, for example, registration is zero degree. In this case, there is no need to offset (=zero) calculated feature values. In other words, the feature values calculated by in-plane rotating estimation can be directly used as feature values for object detection.

FIG. 19 illustrates an example in a case in which the rotating angle of an image with respect to the image at, for example, registration is 120 degrees. In this case, the same feature values as those at registration can be obtained only with the offset of calculated feature values by 120 degrees. In the example of FIG. 12 (as is the case with FIG. 12), the directions of calculation areas with respect to sampling points also change with the directions of the sampling points with respect to the center of a sampling area. Therefore, there is no need to rotate calculation areas after in-plane rotating estimation.

Note that if feature values in which luminance gradient directions are expressed by a histogram are used as illustrated in FIGS. 18 and 19, the direction of the mode of the histogram can be, for example, set as a reference direction. The difference between a reference direction at registration and a reference direction at recognition serves as a rotating angle (offset). Note that a method for setting a reference direction is not limited to it and any method is available so long as the reference direction can be set according to a rule commonly applicable between registration and recognition.

First Modification

In a case in which the distance between a camera and an object and an in-plane rotating angle are different from those at registration, the shape of the object largely changes on the outside rather than the inside a sampling area as compared with the shape of the object at registration. Thus, in order to accurately extract the feature of the object, sampling points may be configured such that they are arranged outside the sampling area in large numbers and their densities become sparse toward the center of the sampling area.

In addition, in a case in which calculation areas are made small and the distances between the calculation areas and sampling points are reduced, recognition performance is degraded if any change occurs but is enhanced if no change occurs. From the reason above, calculation areas on the outside may be made small and the distances between the calculation areas and sampling points may be made small in a case in which the sampling points are arranged on the outside in large numbers. Since a change can be handled by the expression of feature values with a histogram, it is possible to accurately extract the features of an object.

Second Modification

Figure 20:
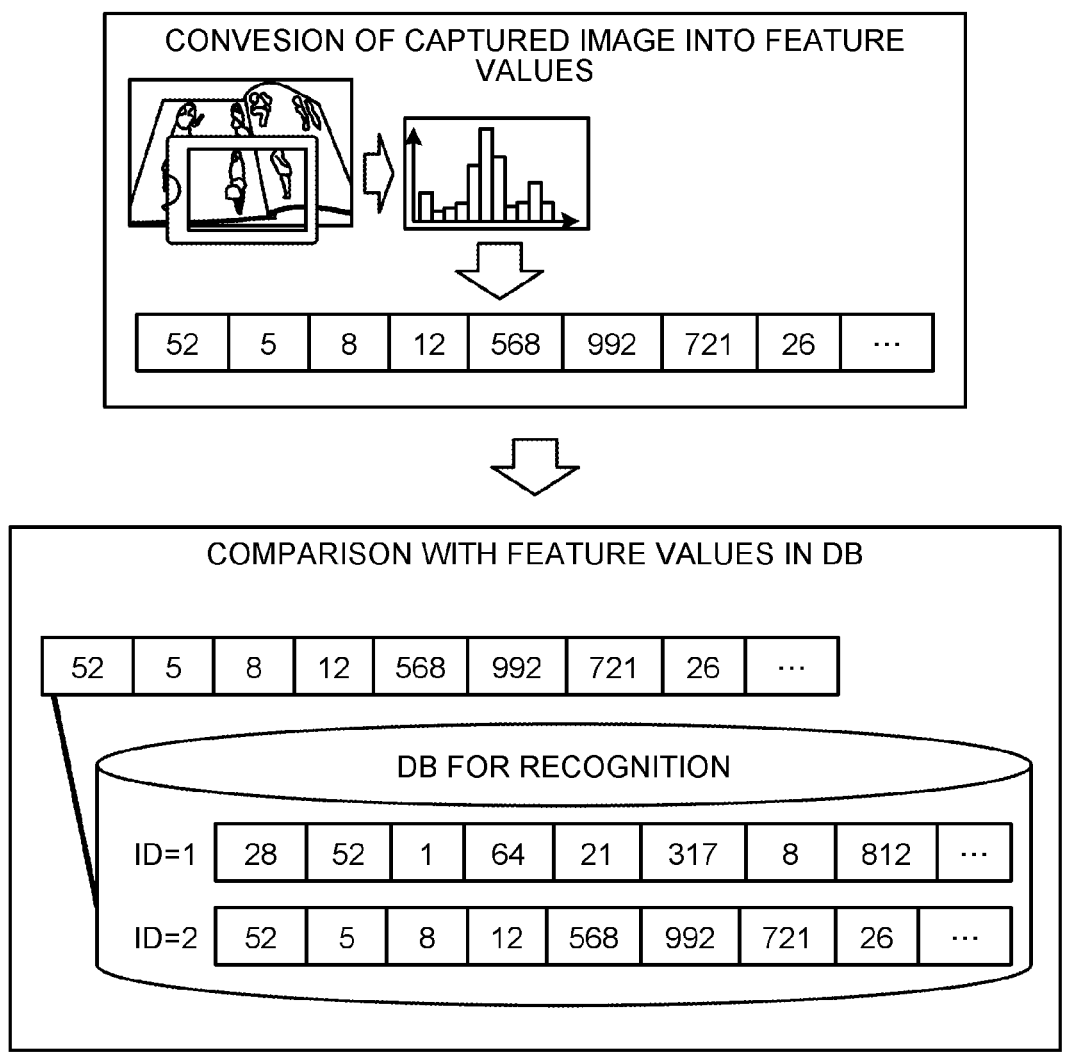
FIG. 20 is a diagram illustrating an example of feature values expressed by a histogram.

FIG. 20 is a diagram illustrating an example of feature values in which luminance gradient directions, etc., are expressed by a histogram. As illustrated in FIG. 20, feature values are generally expressed by real numbers. This poses the problems that the comparison of feature values is time-consuming and the usage of a storage unit (such as the storage unit 121 and a memory) to store the feature values is increased.

Figure 21:
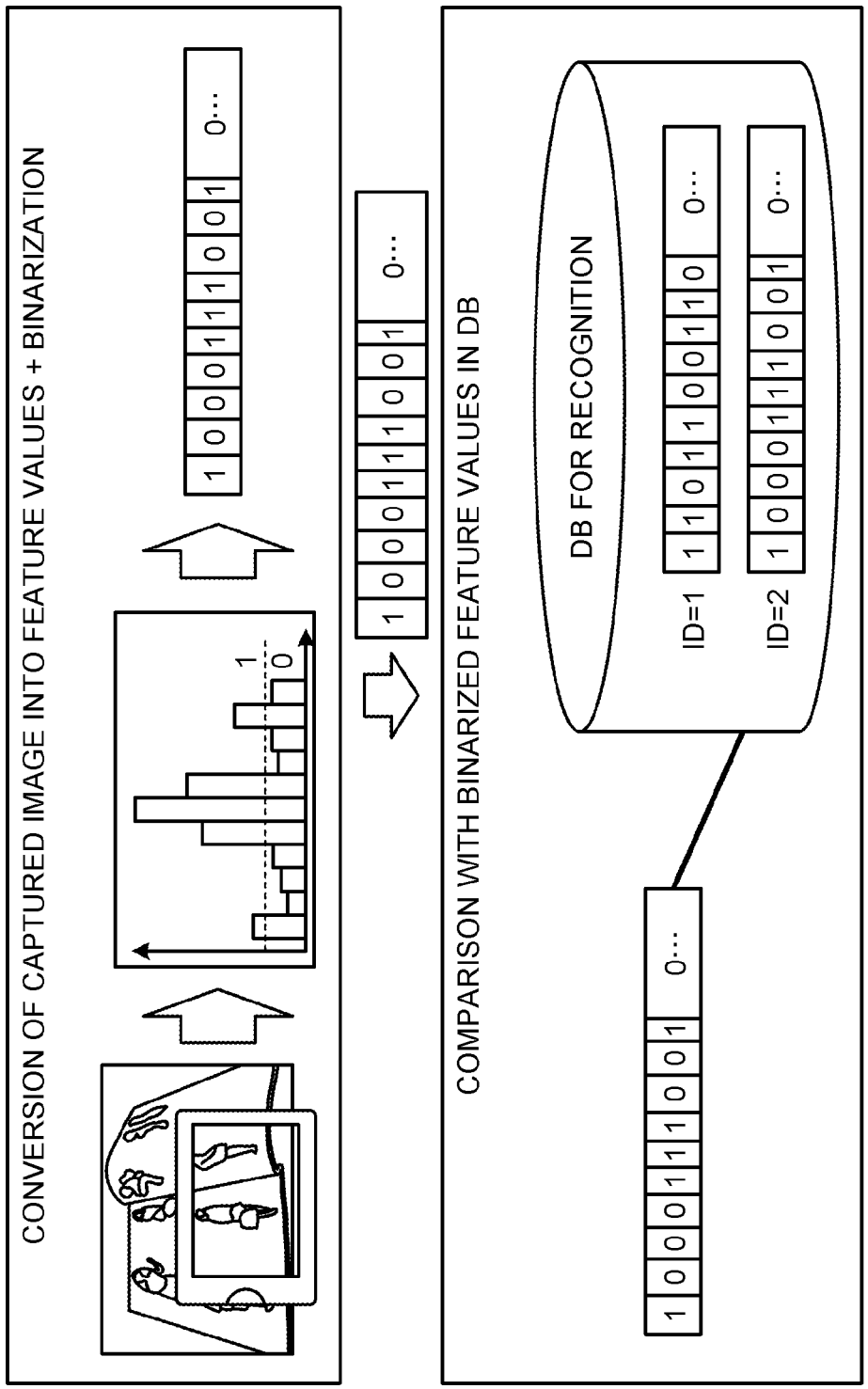
FIG. 21 is a diagram illustrating an example of binarized feature values.

In a second modification, binarized feature values are used to solve such problems. FIG. 21 is a diagram illustrating an example of binarized feature values. FIG. 21 illustrates an example of feature values in which the values (such as real numbers) of the respective bins of the feature values expressed by a histogram as illustrated in FIG. 20 are binarized depending on whether they are larger than a threshold (indicated by a dashed line in FIG. 21).

With the binarization of feature values as described above, it is possible to reduce a data size. In addition, with binarized feature values, it is possible to apply a high-speed similarity calculation method with, for example, a Hamming distance. A binarization method is not limited to the method illustrated in FIG. 21. For example, in a case in which feature values are expressed by vectors, the vector values in each dimension of the feature value vectors may be converted into one if they are greater than or equal to the average of all the vector values and may be converted into zero if they are less than the average. In addition, the vector values in each dimension of the feature value vectors may be converted into one if they are greater than or equal to vector values in an arbitrary dimension and may be converted into zero if they are less than the vector values. The arbitrary dimension may be an adjacent dimension, a randomly-selected dimension, or a previously-set dimension.

As described above, in the image processing apparatus according to the embodiment, sampling points are arranged to provide at least one of the arrangement in which the distances between the adjacent sampling points become smaller toward the center of a sampling area and the arrangement in which the sampling points exist on the circumferences of a plurality of circles different in diameter. Thus, it is possible to standardize feature value calculation processing and reduce a processing load.

Figure 22:
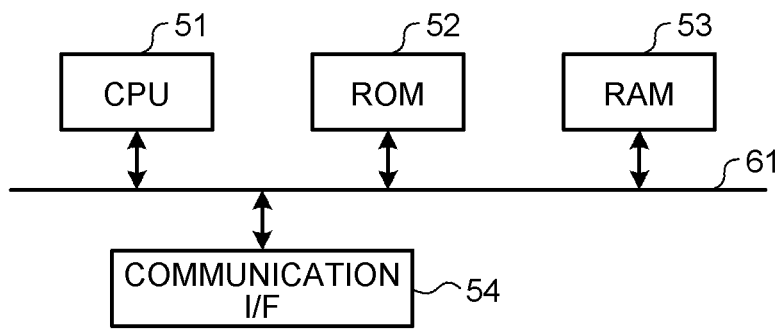
FIG. 22 is a diagram illustrating the hardware configuration of an image processing apparatus according to the embodiment.

Next, with reference to FIG. 22, a description will be given of the hardware configuration of the image processing apparatus according to the embodiment. FIG. 22 is an explanatory diagram illustrating the hardware configuration of the image processing apparatus according to the embodiment.

The image processing apparatus according to the embodiment has a control unit such as a CPU (Central Processing Unit) 51, storage units such as a ROM (Read Only Memory) 52 and a RAM (Random Access Memory) 53, a communication I/F 54 that is connected to a network to perform communication, and a bus 61 that connects the respective units to each other.

A program executed by the image processing apparatus according to the embodiment is recorded beforehand on the ROM 52 or the like to be provided.

The program executed by the image processing apparatus according to the embodiment may be configured to be recorded on a computer-readable recording medium such as a CD-ROM (Compact Disk Read Only Memory), a flexible disk (FD), a CD-R (Compact Disk Recordable), and a DVD (Digital Versatile Disk) in an installable or executable file format to be provided as a computer program product.

In addition, the program executed by the image processing apparatus according to the embodiment may be configured to be stored in a computer connected to a network such as the Internet and downloaded via the network to be provided. Moreover, the program executed by the image processing apparatus according to the embodiment may be configured to be provided or distributed via a network such as the Internet.

The program executed by the image processing apparatus according to the embodiment may cause a computer to function as the respective units (the acquisition unit, the setting unit, the calculator, and the detection unit) of the image processing apparatus described above. The computer can be executed when the CPU 51 reads the program from a computer-readable storage medium into a main storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
a processor including hardware, the processor being configured to operate as at least:
an acquisition unit configured to acquire an image;
a setting unit configured to set a plurality of sampling points in a sampling area of the image, each sampling point being associated with a calculation area for calculating a sum of pixel values; and
a calculator configured to calculate feature values of the image in the calculation area based on the sum of the pixel values, wherein
the setting unit is configured to set the sampling points to provide one or both of
an arrangement in which distances between adjacent sampling points change with distances from a center of the sampling area and
an arrangement in which the sampling points are arranged on circumferences of a plurality of circles different in diameter.

2. The apparatus according to claim 1, wherein
the setting unit is configured to set the sampling points such that the distances between adjacent sampling points become smaller toward the center of the sampling area.

3. The apparatus according to claim 1, wherein
the setting unit is configured to set the sampling points such that the distances between adjacent sampling points become larger toward the center of the sampling area.

4. The apparatus according to claim 1, wherein size of the calculation area changes with distance from the center.

5. The apparatus according to claim 4, wherein the calculation area is smaller in size as distance from the center is smaller.

6. The apparatus according to claim 4, wherein the calculation area is larger in size as distance from the center is smaller.

7. The apparatus according to claim 1, wherein distances between the calculation area and the associated sampling points change with distances from the center to the associated sampling points.

8. The apparatus according to claim 7, wherein
the distances between the calculation area and the associated sampling points are smaller as distances from the center to the associated sampling points are smaller.

9. The apparatus according to claim 7, wherein
the distances between the calculation area and the associated sampling points are larger as distances from the center to the associated sampling points are smaller.

10. The apparatus according to claim 1, wherein
directions from the associated sampling points to the calculation area change with directions from the center to the associated sampling points.

11. The apparatus according to claim 10, wherein
the directions from the associated sampling points to the calculation area coincide with directions from the center to the associated sampling points.

12. The apparatus according to claim 1, wherein
the calculator is configured to calculate the feature values including binarized values.

13. An image processing method, comprising:
acquiring an image;
setting a plurality of sampling points in a sampling area of the image, each sampling point being associated with a calculation area for calculating a sum of pixel values; and
calculating feature values of the image in the calculation area based on the sum of the pixel values, wherein
the setting includes setting the sampling points to provide one or both of
an arrangement in which distances between the adjacent sampling points change with distances from a center of the sampling area and
an arrangement in which the sampling points are arranged exist on circumferences of a plurality of circles different in diameter.

14. A computer program product comprising a non-transitory computer-readable medium containing a program executed by a computer, the program, when executed, causing the computer to perform operations comprising:
acquiring an image;
setting a plurality of sampling points in a sampling area of the image, each sampling point being associated with a calculation area for calculating a sum of pixel values; and
calculating feature values of the image in the calculation area based on the sum of the pixel values, wherein
the setting includes setting the sampling points to provide one or both of
an arrangement in which distances between the adjacent sampling points change with distances from a center of the sampling area and
an arrangement in which the sampling points are arranged on circumferences of a plurality of circles different in diameter.

15. An image processing apparatus, comprising:
a processor including hardware, the processor being configured to operate as at least:
an acquisition unit configured to acquire an image;
a setting unit configured to set a plurality of sampling points in a sampling area of the image, each sampling point being associated with a calculation area; and
a calculator configured to calculate feature values of the image in the calculation area, wherein
the setting unit is configured to set the sampling points to provide one or both of
an arrangement in which distances between the adjacent sampling points change with distances from a center of the sampling area and
an arrangement in which the sampling points are arranged on circumferences of a plurality of circles different in diameter, and
the setting unit is configured to set the sampling points such that the distances between adjacent sampling points become larger toward the center of the sampling area.

* * * * *